United States Patent [19]
Kaneda et al.

[11] Patent Number: 5,742,391
[45] Date of Patent: Apr. 21, 1998

[54] OPTICAL TYPE SENSOR FOR USE AS AN OPTICAL MEASURING HEAD OR OPTICAL PICKUP

[75] Inventors: Yasushi Kaneda, Utsunomiya; Kou Ishizuka, Omiya; Kenji Hisamoto, Utsunomiya, all of Japan

[73] Assignee: Canon Kabushiki Kaisha, Tokyo, Japan

[21] Appl. No.: 579,347

[22] Filed: Dec. 27, 1995

[30] Foreign Application Priority Data

Dec. 27, 1994 [JP] Japan ................. 6-325130

[51] Int. Cl.⁶ ................................ G01B 9/02
[52] U.S. Cl. .............. 356/356; 250/237 G; 250/239
[58] Field of Search ................ 356/354, 356; 250/237 G, 239

[56] References Cited

U.S. PATENT DOCUMENTS

| | | | |
|---|---|---|---|
| 4,766,310 | 8/1988 | Michel | 250/237 G |
| 4,965,445 | 10/1990 | Ikeuchi et al. | 250/231.13 |
| 5,026,164 | 6/1991 | Ichikawa | 356/373 |
| 5,067,816 | 11/1991 | Ichikawa | 356/373 |
| 5,283,434 | 2/1994 | Ishizuka et al. | 250/237 G |
| 5,424,833 | 6/1995 | Huber et al. | 250/237 G |

FOREIGN PATENT DOCUMENTS

| | | |
|---|---|---|
| 0223009 | 5/1987 | Germany. |
| 3922440 | 2/1990 | Germany. |
| 0533973 | 3/1993 | Germany. |
| 4234433 | 4/1994 | Germany. |
| 62-121314 | 6/1987 | Japan. |
| 1180615 | 12/1989 | Japan. |

*Primary Examiner*—Frank G. Font
*Assistant Examiner*—Robert Kim
*Attorney, Agent, or Firm*—Fitzpatrick, Cella, Harper & Scinto

[57] ABSTRACT

An optical type sensor has a light emitting element, a light receiving element, at least one optical element acting on a light beam emitted from the light emitting element, in an optical path till the light beam enters the light receiving element, and a spacer member disposed to define a spacing between the light emitting element and/or the light receiving element and the at least one optical element, the spacer member having a structure for being mounted to other member.

21 Claims, 5 Drawing Sheets

OPTICAL TYPE SENSOR FOR USE AS AN OPTICAL MEASURING HEAD OR OPTICAL PICKUP

BACKGROUND OF THE INVENTION

1. Field of the Invention

This invention relates to an optical type sensor such as an optical measuring head or an optical pickup.

2. Related Background Art

A method of applying light and receiving the reflected light or transmitted light thereof to thereby obtain information about an object which reflects or transmits the light therethrough has heretofore been widely utilized in optical pickups and optical measuring apparatuses. Today, downsizing and high accuracy is required of these optical measuring apparatuses and the like.

As techniques effective for such downsizing, ones as will hereinafter be described are known. FIG. 1 of the accompanying drawings shows an optical type displacement sensor described in Japanese Laid-Open Utility Model Application No. 1-180615. A light beam emitted from a light emitting element 42 is that in a known example of an encoder, and when the light beam emitted from the light emitting element 42 is made into a linear ray array by a slit array 14 on an index scale 44 and is applied to a grating 12 on a scale 40, the image of the grating 12 is projected onto an index grating 16 by a light beam reflected from the grating 12, and a quantity of light entering a light receiving element 48 is modulated by the geometric overlap of the two.

FIGS. 2A and 2B of the accompanying drawings show an optical type encoder described in Japanese Laid-Open Patent Application No. 62-121314. In these figures, there is shown a construction in which a light beam emitted from a light emitting element L is made into a parallel light beam by a lens 2 and when it is applied to a grating GK (A) on an index Scale A, it is diffracted and light beams in the direction of emergence are created in three directions and the respective light beams are diffracted by a grating GK (B) on a scale B and are subjected to the phase modulation by relative movement and are returned to the grating GK (A) on the index scale A, and by the action of the diffraction by the index grating (and prisms K1 and K2), three sets of coherent light beams enter light receiving elements $O_0$, etc.

SUMMARY OF THE INVENTION

In view of the above-described examples of the prior art, the present invention has an object thereof to provide an optical type sensor in which unnecessary light will be effectively intercepted even if the sensor is particularly made compact.

In view of the above-described examples of the prior art, the present invention has an another object thereof to provide an optical sensor in which the disposition of a construction for mounting the sensor onto other member will be easy even if the sensor is particularly made compact.

Other objects of the present invention will become apparent from the following detailed description of some embodiments of the invention.

DESCRIPTION OF THE PREFERRED EMBODIMENTS

Some embodiments of the present invention will hereinafter be described with reference to the drawings.

Figure 1:
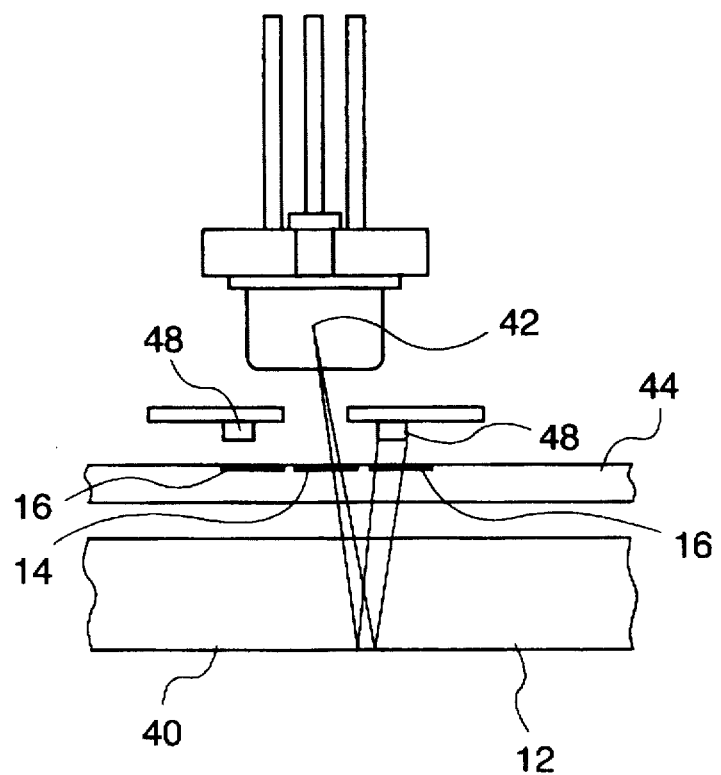
FIG. 1 is an illustration of an example of the prior art.
Figure 2A:
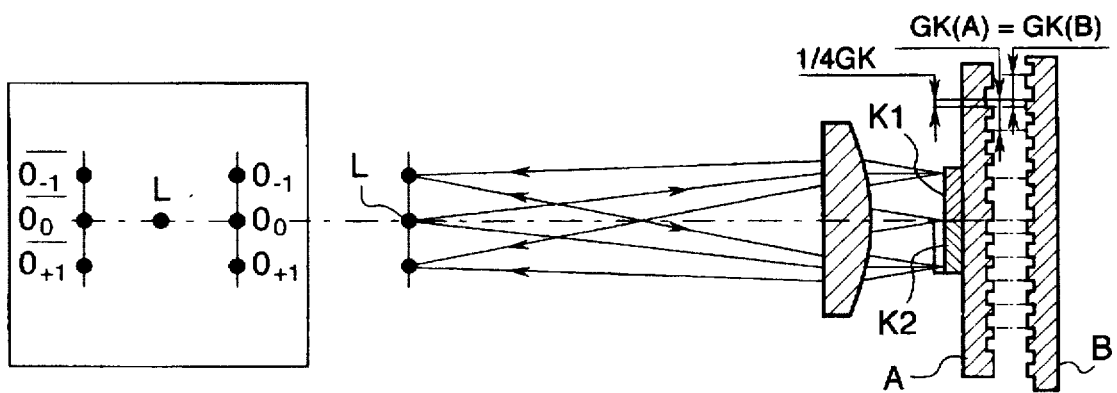
FIGS. 2A and 2B are illustrations of an example of the prior art.
Figure 2B:
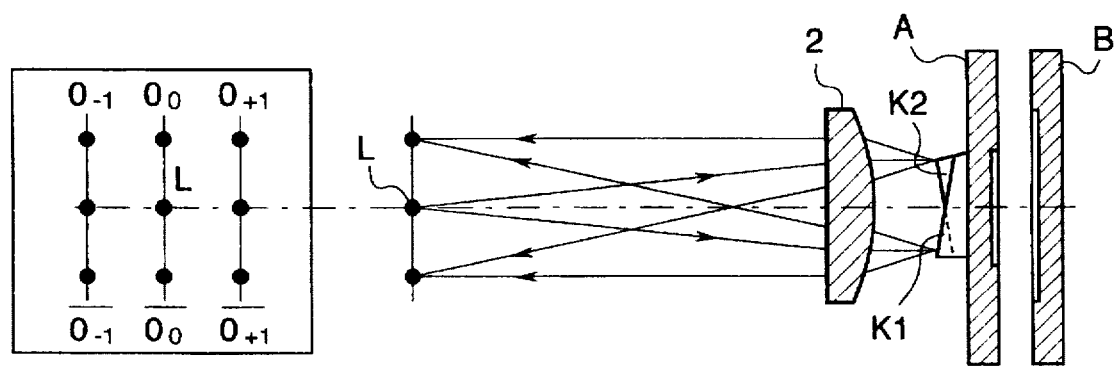
Figure 3:
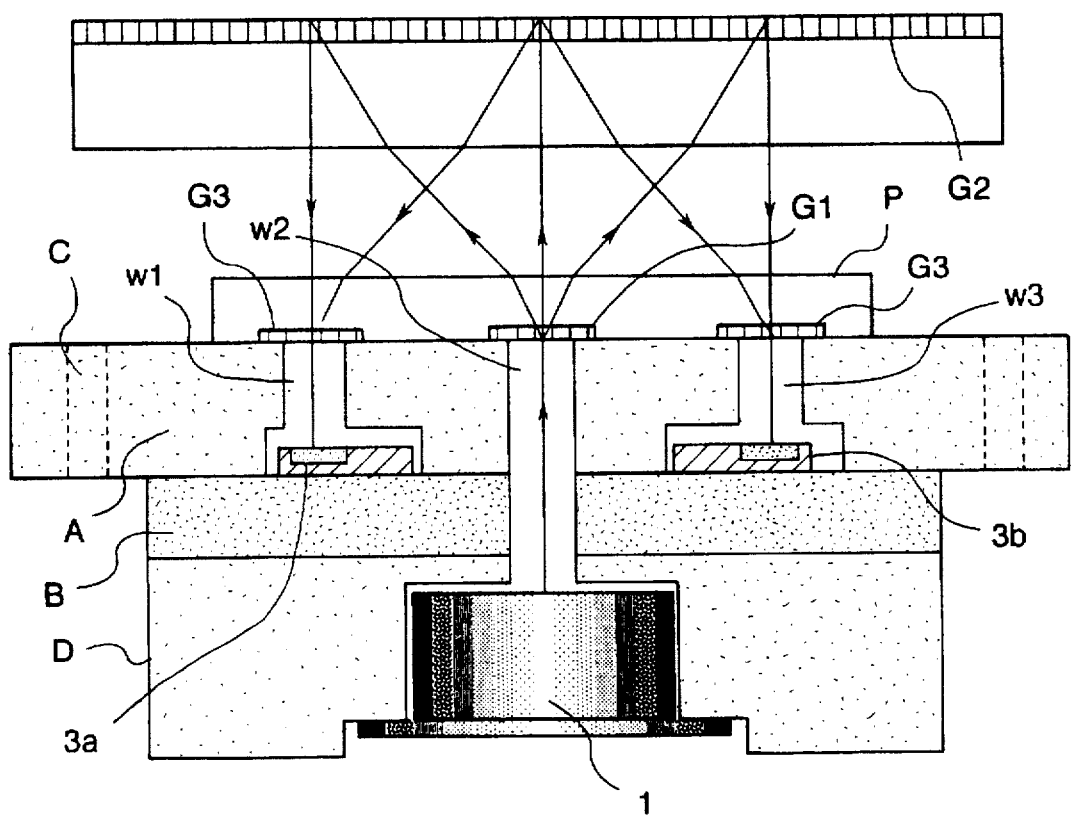
FIG. 3 is an illustration of an optical type displacement sensor according to a first embodiment of the present invention.

FIG. 3 is an illustration (side cross-sectional view) of an optical type displacement sensor according to a first embodiment of the present invention. In FIG. 1, the reference numeral 1 designates a light emitting element such as an LD or an LED, the reference characters $3a$ and $3b$ denote light receiving elements, the reference character G1 designates a diffraction grating for dividing a light beam emitted from the light source, the reference character G2 denotes a diffraction grating which is a scale for modulating the divided light beams, the reference character G3 designates diffraction gratings for combining the light beams, the letter P denotes a transparent base plate on which the diffraction gratings G1 and G3 are provided, the letter A designates a member which is a spacer between the light receiving elements $3a$, $3b$ and the diffraction grating G3, the letter B denotes a (base plate) member on which the sensor is fixedly mounted, the letter C designates a mounting structure (herein a mounting hole for a fixing screw) for mounting the member A on other member, for example, the mounting portion of one of two objects of which the relative displacement is to be measured, the letter D denotes a member for fixedly mounting the light source, the reference characters w1 and w3 designate light receiving window portions (openings) formed in the member A, and the reference character w2 denotes a window portion (opening) for emergence formed in the member A. The member A is secured to the transparent base plate P. The members A, B and D are fixedly joined to one another and serve also as a spacer between the light emitting element 1 and the diffraction grating G1. Also, the members A, B and D are formed by light intercepting members. The diffraction grating G2 is provided on an object displaced relative to other member forming a head body portion, for example, the other of the aforementioned two objects.

The principle of measurement of the present embodiment is shown hereinbelow. In FIG. 3, the light beam emitted from the light emitting element 1 is transmitted through and diffracted by the diffraction grating G1 and is divided into 0-order (diffracted) light and ±1st-order diffracted lights.

The 0-order light beam rectilinearly travelling through the diffraction grating G1 is reflected and diffracted by the diffraction grating G2 and is divided into ±1st-order diffracted lights and phase-modulated, and the ±1st-order diffracted lights enter the diffraction gratings G3 disposed at the right and left as viewed in FIG. 3. At this time, the phase of the −1st-order diffracted light deviates by $-2\pi x/p$ and the phase of the +1st-order diffracted light deviates by $+2\pi x/p$. Here, x is the amount of movement of the scale, and P is the pitch of the scale. The light beam having entered the diffraction grating G3 is separated into ±1st-order diffracted lights and other light beams. Here, utilization is made of only the light beams transmitted and diffracted in a direction perpendicular to the diffraction grating G3 (the +1st-order diffracted light of the −1st-order diffracted light from the diffraction grating G2 and the −1st-order diffracted light of the +1st-order diffracted light from the diffraction grating G2).

The light beam 1st-order diffracted by the diffraction grating G1 is reflected and diffracted by the diffraction grating G2 and is separated into −1st-order diffracted light, 0-order diffracted light and other diffracted lights, of which the −1st-order diffracted light taken out perpendicularly to the diffraction grating G2 which is a scale enters the diffraction gratings G3. The phase of the −1st-order diffracted light having entered the diffraction gratings G3 becomes $-2\pi x/p$, and the light beam having been transmitted and rectilinearly travelled is combined with the −1st-order diffracted light having rectilinearly travelled in the diffraction grating G1 and diffracted in the diffraction gratings G3, and becomes coherent light and enters the sensor $3a$. The interference phase at this time is $$\{+2\pi x/p\}-\{-2\pi x/p\}=4\pi x/p$$

and a light-and-shade signal of one period is created each time the diffraction grating G2 which is a scale deviates by p/2 pitch in the direction of arrangement of the gratings. Because a distance between the most right side grating of the left gratings G3 and the most left side grating of the right gratings G3 is np+p/4 or np+3p/4, where n is a predetermined natural number, on the sensor $3b$ side also, an interference signal deviating in phase by ¼phase with respect to the sensor $3a$ is created by the same principle. The outputs of these sensors $3a$ and $3b$ are signal-processed by a signal processing circuit, not shown, and information such as the amount and direction of relative displacement of the diffraction grating G2 and the head body side is obtained by a well-known method.

In such an optical system, windows for light emergence and light reception are provided in the light intercepting member A holding the diffraction gratings G1 and G3. Likewise, only windows for light emergence are provided in the light intercepting members B and C.

The above-described embodiment has the following effects.

1) In the optical system as described above, when light beams are transmitted through the gratings G3 which combine the light beams, other diffracted lights than the necessary light beams perpendicular to the gratings are created. In the present embodiment, the member A holding the diffraction gratings G1 and G3 is a light intercepting member having light receiving window portions w1 and w3 and therefore, in spite of being such a compact construction, these lights can be effectively cut and the quality of the output signal can be prevented from being deteriorated.

2) The above-described embodiment is one in which the interference optical system is of a very simple construction, and the member A joined to the transparent base plate P on which the diffraction gratings G1 and G3 are provided has also the mask effect of intercepting any unnecessary light between the light emitting element 1 and the light receiving element 3 and therefore, the structure is simple and the number of parts is small and assembly becomes easy at low costs.

3) The space portion including the window portions w1 and w3 is small and therefore, the protection of the light receiving element becomes easy and it becomes possible to prevent any reduction in performance which would otherwise result from the deterioration of the light receiving element.

4) The member A according to the present invention is provided with the mounting structure C and therefore, in spite of being a compact construction, the space for mounting with respect to other members is secured and the mounting becomes simple.

Figure 4:
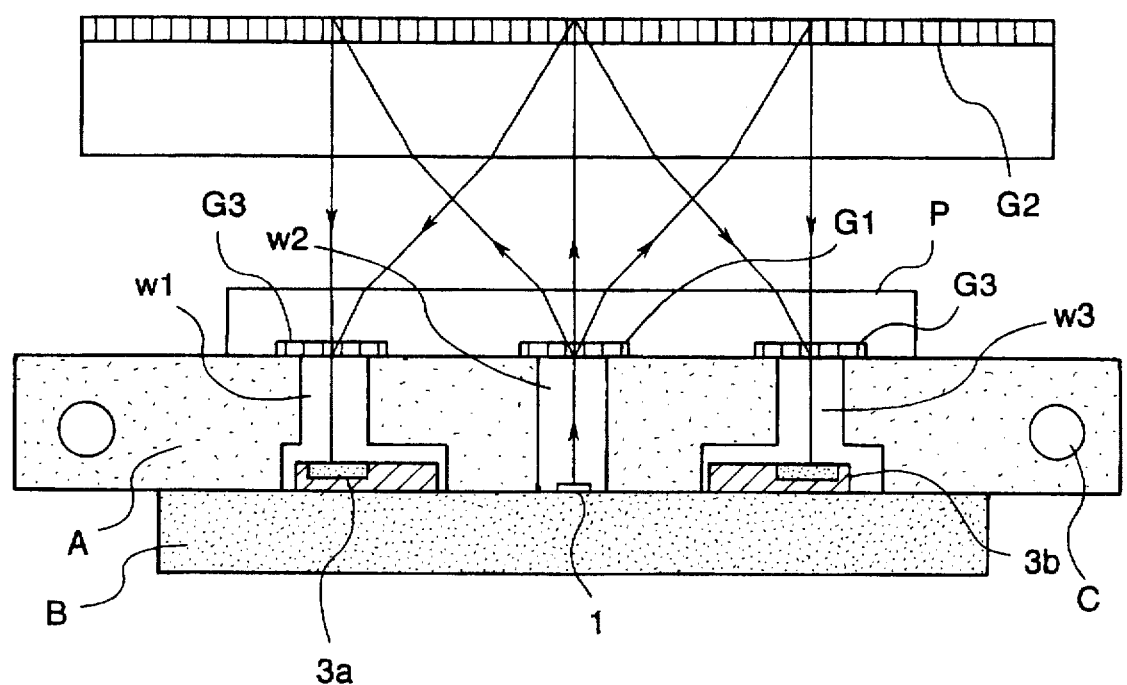
FIG. 4 is an illustration of an optical type displacement sensor according to a second embodiment of the present invention.

FIG. 4 is an illustration (side cross-sectional view) of an optical type displacement sensor according to a second embodiment of the present invention. In FIG. 4, members similar to those in the embodiment of FIG. 3 are given the same reference characters. In the present embodiment, both the sensors $3a$, $3b$ and the light source 1 are mounted on the member B and the spacings between the diffraction gratings G1 and G3 are regulated by the member A which is a spacer. Also, the mounting structure C (the mounting hole for a screw) is provided sideways.

The principle of measurement of the present embodiment is the same as that of the first embodiment.

In such an optical system, window portions for light emergence and for light reception are provided in the member A holding the diffraction gratings G1 and G3.

The above-described second embodiment has the following effect in addition to the effects of the aforedescribed first embodiment.

1) The above-described embodiment is in a form in which the light emitting element itself is intactly mounted on the member B which is a base plate, and in a state in which the member A is absent, the light beam emitted from the light emitting element spreads in all directions due to reflection or the like. However, any unnecessary light can be intercepted by the member A and there can be obtained a signal which has a good S/N.

In the above-described embodiment, the mounting structure is a mounting hole for a screw, but alternatively, it may be a fit structure for the fit-in type mounting or an adhesively securing portion for an adhesively securing type mounting.

Figure 5A:
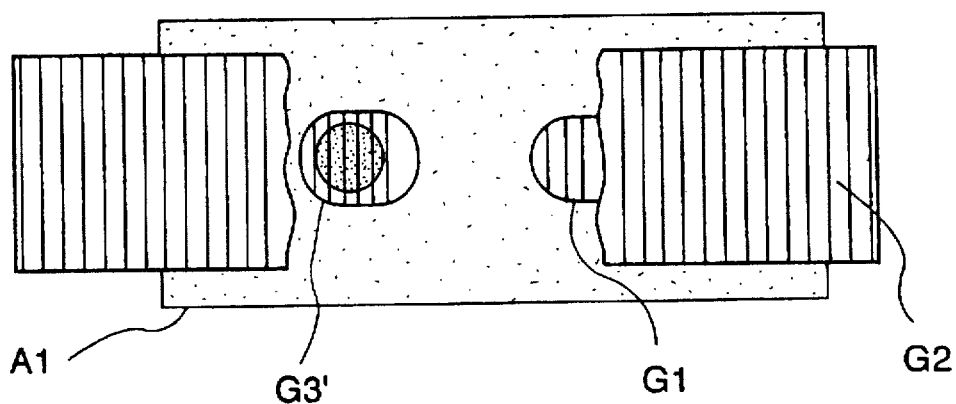
FIGS. 5A and 5B are illustrations of an optical type displacement sensor according to a third embodiment of the present invention.
Figure 5B:
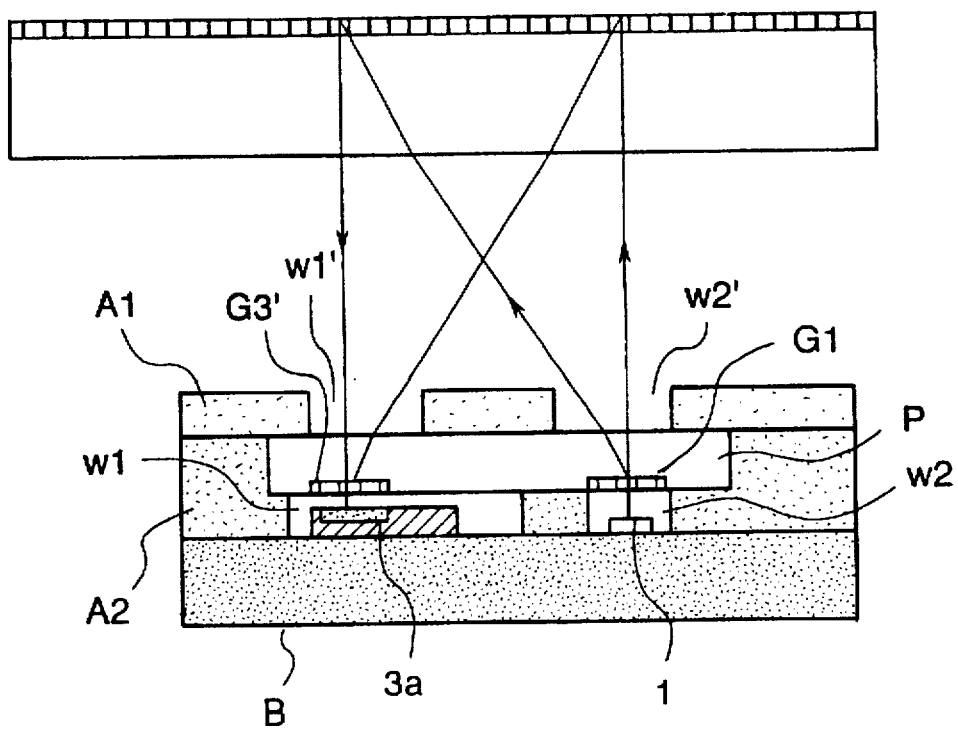

FIGS. 5A and 5B are illustrations of an optical type displacement sensor according to a third embodiment of the present invention. FIG. 5A is a top plan view and FIG. 5B is a side cross-sectional view. In FIGS. 5A and 5B, members similar to those in the embodiments of FIGS. 3 and 4 are given the same reference characters. In the present embodiment, a system differing from the systems like the above-described embodiments is utilized. That is, in the present embodiment, a plurality of simple slits G3' are used in lieu of the diffraction gratings G3, and use is made of only the lights travelling to the left side of the light emitting element as viewed in the side view. The slits G3' are provided at a location whereat an interference fringe formed by the two light beams which have travelled in the manner described above intersecting each other is created, and this interference fringe moving by the displacement of the diffraction grating G2 overlaps the slits G3', whereby a periodic variation in the quantity of light is detected by a sensor $3a$ disposed on the transmission side of the slits G3'. Thereby, the displacement of the diffraction grating G2 is obtained in a signal processing system, which is not shown.

In the present embodiment, a member A2 which is a spacer prescribing the spacings between the diffraction grating G1, the slits G3' and the light emitting element 1, the sensor $3a$ is a member having a window w2 for the emitted light from the light emitting element 1 and a window w1 for the incident light onto the sensor $3a$, and having a light intercepting property, and has also the function of covering the end portion of the transparent base plate P. Also, in the present embodiment, a member A1 which is an upper cover having windows w1' an w2' for the passage of light beams is provided in close contact with the member A2. Although not shown, the member A2 has a mounting structure similar to that in the first or second embodiment.

While each of the above-described embodiment is an optical type displacement sensor, the present invention may be used in other optical type sensors, for example, optical type shape measuring sensors.

As described above, according to each embodiment of the present invention, in spite of being a compact construction, the lights can be effectively cut and the quality of the output signal can be prevented from being deteriorated. Also, in spite of having a compact construction, the space for mounting with respect to another member is secured and mounting is made simple.

What is claimed is:

1. An optical type sensor comprising:

a light emitting element;

a light receiving element;

at least one optical element acting on a light beam emitted from said light emitting element, in an optical path before said light beam enters said light receiving element; and a spacer member disposed to define a spacing between said light emitting element and/or said light receiving element and said at least one optical element, said light emitting element, said at least one optical element, and said spacer member constituting a head member, and said spacer member being structured so as to mount to another member to which said head member is to be mounted.

2. The sensor according to claim 1, wherein said spacer member is formed by a light intercepting member having a window portion for the passage of said light beam.

3. The sensor according to claim 1, wherein said spacer is structured to mount to the other member by means of a mounting hole for a fixing screw.

4. The sensor according to claim 1, further comprising a base plate upon which each of said light emitting element and said light receiving element are disposed.

5. The sensor according to claim 1, wherein said light emitting element is mounted on said spacer member through a predetermined member.

6. The sensor according to claim 1, wherein said at least one optical element includes a separating diffraction grating for separating the light beam emitted from said light emitting element into a plurality of light beams.

7. The sensor according to claim 6, wherein said spacer member prescribes the spacing between said light emitting element and said separating diffraction grating.

8. The sensor according to claim 1, wherein said at least one optical element includes a wave combining diffraction grating for combining a plurality of diffracted lights, from a diffraction grating, which are to be measured.

9. The sensor according to claim 8, wherein said spacer member prescribes the spacing between said light emitting element and said wave combining diffraction grating.

10. The sensor according to claim 1, wherein said at least one optical element has a slit element for overlapping with an interference fringe created at a location of intersection between a plurality of diffracted lights, from said diffraction grating, which are to be measured.

11. An optical type sensor having:

a light emitting element;

a light receiving element;

at least one optical element acting on a light beam emitted from said light emitting element, in an optical path before said light beam enters said light receiving element; and a spacer member disposed between said at least one optical element and both of said light emitting element and said light receiving element to define a spacing between said light emitting element and/or said light receiving element and said at least one optical element, said spacer member being formed by a light intercepting member having a first window portion which allows passage of the light beam emitted from said light emitting element, and a second window portion, different from said first window portion, which allows passage of the light beam as it is entering said light receiving element.

12. The sensor according to claim 11, further comprising a base plate upon which each of said light emitting element and said light receiving element are disposed.

13. The sensor according to claim 11, wherein said light emitting element is mounted on said spacer member through a predetermined member.

14. The sensor according to claim 11, wherein said at least one optical element includes a separating diffraction grating for separating the light beam emitted from said light emitting element into a plurality of light beams.

15. The sensor according to claim 14, wherein said spacer member prescribes the spacing between said light emitting element and said separating diffraction grating.

16. The sensor according to claim 11, wherein said at least one optical element includes a wave combining diffraction grating for combining a plurality of diffracted lights from a diffraction grating, which is to be measured.

17. The sensor according to claim 16, wherein said spacer member prescribes the spacing between said light emitting element and said wave combining diffraction grating.

18. The sensor according to claim 11, wherein said at least one optical element has a slit element for overlapping with an interference fringe created at the location of intersection between a plurality of diffracted lights, from a diffraction grating, which is to be measured.

19. An optical type sensor having:

a light emitting element;

a light receiving element;

first and second optical elements acting on a light beam emitted from said light emitting element, in an optical path till said light beam enters said light receiving element, said first and second optical elements being provided on at least one transparent plate; and a base plate-like spacer member disposed between said at least one transparent plate and both of said light emitting element and said light receiving element to define a spacing between said light emitting element and said first optical element and between said light receiving element and said second optical element, said spacer member having a first window portion for the optical path between said light emitting element and said first optical element, and a second window portion for the optical path between said light receiving element and said second optical element.

20. The sensor according to claim 19, wherein said spacer member is formed by a light intercepting member.

21. The sensor according to claim 19, wherein said spacer member is structured to provide for mounting to another member.

* * * * *

UNITED STATES PATENT AND TRADEMARK OFFICE
CERTIFICATE OF CORRECTION

PATENT NO. : 5,742,391

DATED : April 21, 1998

INVENTOR(S) : YASUSHI KANEDA, ET AL.

It is certified that error appears in the above-identified patent and that said Letters Patent is hereby corrected as shown below:

ON THE TITLE PAGE:

AT [56] REFERENCES CITED

FOREIGN PATENT DOCUMENTS

"1180615" should read --1-180615--.

AT [57] ABSTRACT

Line 8, "other" should read --the other--.

COLUMN 1

Line 15, "is" should read --are--;
Line 37, "Scale" should read --scale--; and
Line 53, "an" should be deleted.

Signed and Sealed this

Twenty-fourth Day of November, 1998

Attest:

BRUCE LEHMAN

Attesting Officer

Commissioner of Patents and Trademarks